United States Patent [19]

Lazzara

[11] Patent Number: 4,519,856
[45] Date of Patent: May 28, 1985

[54] RESIN-CLOTH STRUCTURAL SYSTEM

[75] Inventor: Richard J. Lazzara, Lake Worth, Fla.

[73] Assignee: Neptune Research, Inc., Palm Beach, Fla.

[21] Appl. No.: 502,644

[22] Filed: Jun. 9, 1983

[51] Int. Cl.³ .............................................. B29C 27/30
[52] U.S. Cl. ................................... 156/49; 29/402.09;
114/227; 156/94; 156/293; 264/36; 427/140;
428/63; 428/69; 428/76
[58] Field of Search ...................... 29/402.09; 114/227,
114/228, 229; 156/94, 49, 53, 293; 206/389,
411, 582, 814, 225; 264/36; 427/140; 428/63,
69, 76

[56] References Cited

U.S. PATENT DOCUMENTS

| | | | |
|---|---|---|---|
| 2,902,388 | 9/1959 | Szukiewicz | 427/393.6 |
| 3,193,438 | 7/1965 | Schafer | 156/184 X |
| 3,235,289 | 2/1966 | Jones | 156/49 X |
| 3,388,016 | 6/1968 | Murray et al. | 156/94 |
| 3,531,345 | 9/1970 | Torosian | 156/94 |
| 3,682,179 | 8/1972 | Firth et al. | 206/582 X |
| 3,694,301 | 9/1972 | Gruenewald et al. | 428/315.7 X |
| 3,847,722 | 11/1974 | Kistner | 156/94 X |

FOREIGN PATENT DOCUMENTS 1565564 4/1980 United Kingdom ................ 206/582

Primary Examiner—Robert A. Dawson
Attorney, Agent, or Firm—Wolf, Greenfield & Sacks

[57] ABSTRACT

A construction material adapted for a wide variety of uses is shown, as, for example, in repairing cracks, holes and dents in the hulls and bodies of boats and land vehicles, leaks in gas and liquid conduits such as exhaust pipes and water pipes, and leaks in gas and liquid tanks and other containers; repairing fractured poles, booms, spars, antennas, and the like, and strengthening similar structures that are not fractured; patching roofs, gutters, and drainpipes; sealing leaking containers of pressurized fluids, such as air-conditioning systems, swimming pools, and hydraulic hoses; and electrically insulating all manner of articles. The product comprises a flexible web impregnated with a pliable mastic in a sealed package which maintains its contents in stable soft and pliable condition until opened, after which the web is applied to the use intended and the mastic begins to harden in place upon exposure to water, or to only the moisture in the air. The mastic is able to harden and cure under water, salt or fresh.

11 Claims, 2 Drawing Figures

RESIN-CLOTH STRUCTURAL SYSTEM

BACKGROUND OF THE INVENTION

This invention relates in general to construction materials for a wide variety of uses, as, for example, in repairing cracks, holes and dents in the hulls and bodies of boats and land vehicles, leaks in gas and liquid conduits such as exhaust pipes and water pipes, and leaks in gas and liquid tanks and other containers; repairing fractured poles, booms, spars, antennas, and the like, and strengthening similar structures that are not fractured; patching roofs, gutters, and drainpipes; sealing leaking containers of pressurized fluids, such as air-conditioning systems, swimming pools, and hydraulic hoses; and electrically insulating all manner of articles. More particularly, the invention provides construction materials for the foregoing and other purposes comprising a flexible web impregnated with a pliable mastic in a sealed package which maintains its contents in stable soft and pliable conditions until opened, after which the web is applied to the use intended and the mastic begins to harden in place upon exposure to water, or to only the moisture in the air. The mastic is able to harden and cure under water, salt or fresh.

DESCRIPTION OF AN EMBODIMENT

Other advantages and features of the invention are described in the following description of an exemplary embodiment, with reference to the accompanying drawing, in which.

Figure 1:
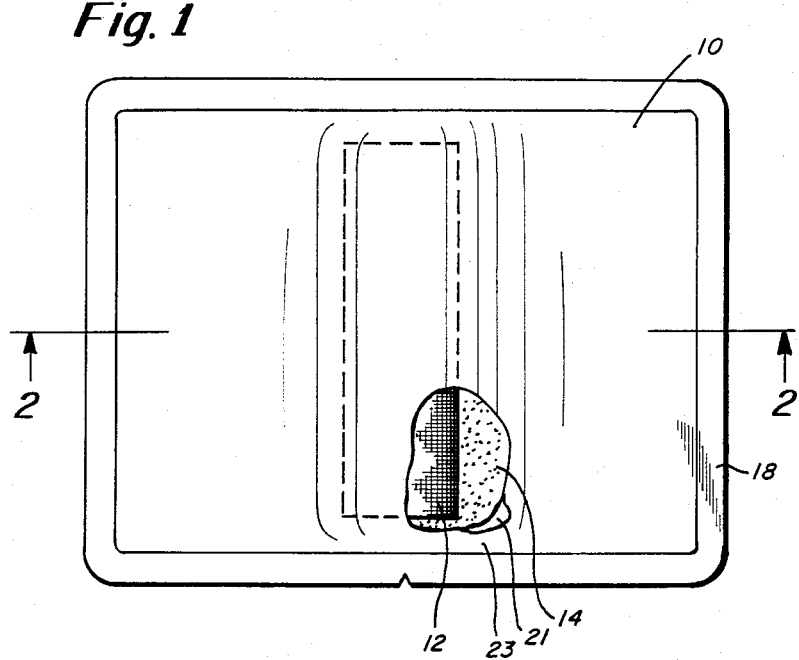
FIG. 1 is a plan view of a rolled web in a sealed package.
Figure 2:
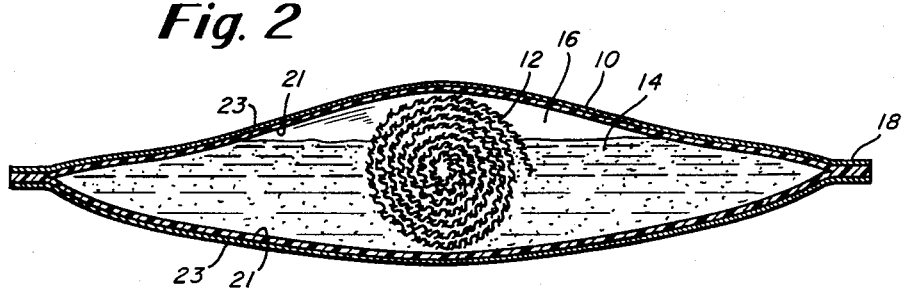
FIG. 2 is a section on line 2—2 of FIG. 1.

A sealed package or envelope 10 enclosing a piece of fiberglass web, or fabric, (woven or non-woven) such as a fiberglass cloth 12 and a charge of mastic which is suitable for use in the invention, such as a resin 14, which impregnates the cloth 12, together with a charge of nitrogen gas 16. A non-woven web made of a bundle of parallel fibers impregnated with the resin is useful for some application, such as wrapping a pipe. The envelope 10 is desirably a bag of moisture-impervious material (e.g.: a multi-layer plastics 21 and metal foil 23 material) which is sealed at its edges 18. An aluminum outer foil 23 is suitable. There may be several layers 23-21-23-21, etc., in the envelope. The nitrogen gas serves to isolate the resin 14 from air and moisture, so that the resin remains intact.

A suitable woven fiberglass cloth 12 is available commercially from Carolina Narrow Fabric Company, P.O. Box 1400, Winston-Salem, N.C. 27102, identified as "Style #520-3," or Mutual Industries Columbia Glas-Tape #2964. The resin 14 which is presently used in practicing the invention is a product of Orthocast Inc., 3896 Burns Road, Palm Beach Gardens, Fla. 33410, identified as "Orthocast #6 formulation," and described as an aeromatic polyethene urethane prepolymer which cures to form a hard semi-flexible polymer containing both polyurethane and polyurea functional groups.

For repairing cracks and holes under water in boat hulls, the envelope 10 is opened and the resin-impregnated fiberglass-cloth patch 12 is applied directly over the hole or stuffed into the crack. The resin 14 begins to harden immediately. The rapidity of the set is dependent to some degree on the temperature of the water. I have discovered that complete curing and set will proceed under water, whether the water is salt water or fresh water. Thus, the invention provides a reliable patch for boat hulls which can be applied directly from its package to an underwater crack or hole, and which will harden to an effective patch while under water, with no further physical or chemical step being required.

For repairing hoses, pipes, exhaust and waste lines, the fiberglass-cloth patch 12 is preferably elongate in shape. A densely-woven fiberglass cloth such as Carolina #1044 applied in layers is preferred to form a good seal to leaking fluids. Upon opening the envelope 10, the patch is wrapped in several layers around the hose or pipe, and the resin is immediately catalyzed by exposure to environmental humidity. It can be soaked in water, prior to use, if desired, to provide additional moisture in a low-humidity environment, or to increase the rapidity of set.

The resin 14 has no odor and it will not support combustion. It will adhere to metals, fiberglass cloth, PVC and other materials, and it is resistant to gasoline, oil, diesel fuel and most solvents in the hardened state. It is electrically a non-conductor.

For repairing a fuel or holding tank, the patch can be applied to the outside of the tank. For repairing a leaking swimming pool, the patch can be applied to the inside of the pool, under water.

The invention is suitable in particular for outdoor and marine use to insulate and moisture-seal electric wire junctions. Ordinary friction tape can insulate such junctions but cannot moisture-seal them. The usual practice is to make electric wire junctions in a box fitted with one or more stuffing tubes and a water-tight cover. This invention offers the possibility to eliminate junction boxes outdoors and for marine applications.

For repairing a roof, the patch is applied to the roof surface. The resin-impregnated web is particularly suited to repairing metal roofs and building-exterior surfaces since the illustrated resin adheres readily to metals, and particularly when used with a densely-woven fabric 12 provides a water-integrity seal when the resin has hardened.

The illustrated resin-impregnated web system of the invention has been found to be uniquely effective in providing a repair patch or leak seal in air or water directly from a package without mixing, measuring or application of other chemicals or special environment, which will set within minutes under water or in the presence of water or moisture. The web can be woven, or non-woven, and the web material can be chosen from a wide variety of synthetic and natural starting materials and fibers. For structural strength, leak sealing, good adhesion to metal surfaces, and roof patching, the denser webs such as Reichhold #821-075 MAT, Carolina Fabric #1544-C, and Columbia Glas-tape Style #2964 can be utilized. Forming a repair from the resin-impregnated web above water can be accelerated by placing the freshly-opened web-and-mastic patch under water for about 20 seconds. Accordingly, it is useful to provide a bucket of water when applying the invention in an above-water situation.

I claim:

1. A method of applying a construction material to an industrial article, for substantially water-tight repairing, reinforcing, patching, sealing and the like of articles such as, but not limited to, structures, vehicle bodies, boat bodies, tanks, containers, conduits, electrical conductors and joints, comprising impregnating a piece of fabric material with a resinous pliable-mastic material having the property that while in its pliable condition it readily adheres to surfaces of articles, and the further property that upon exposure to aqueous moisture in a gaseous medium, or water in the atmosphere or under water, it hardens spontaneously, holding said impregnated fabric material in a moisture-impervious envelope together with a charge of substantially dry gas until used, opening said envelope and applying said impregnated fabric material directly from said envelope to an industrial article in the presence of moisture, and curing said resinous material to form a structural member adhered to said article.

2. A method according to claim 1 in which said dry gas is nitrogen.

3. A method according to claim 1 in which said fabric material is a woven fiberglass cloth.

4. A method according to claim 1 in which said fabric material is a non-woven fabric.

5. A method according to claim 1 in which said mastic is a polyurethane resin.

6. A method of applying a construction material to an article comprising impregnating a fabric with a resinous mastic which hardens upon exposure to aqueous moisture, isolating said mastic-impregnated fabric from moisture until application thereof to said article, removing said mastic-impregnated fabric from its isolation and applying said mastic-impregnated fabric directly to said article in the presence of aqueous moisture or water.

7. A method according to claim 6 in which said mastic-impregnated fabric is applied to said article under water.

8. A method according to claim 7 in which said mastic-impregnated fabric is applied to said article under salt water.

9. A method according to claim 6 in which said mastic-impregnated fabric is stuffed into a crack or hole in said article.

10. A method according to claim 6 in which said mastic-impregnated fabric is adhered to a surface of said article.

11. A method according to claim 6 in which said mastic-impregnated fabric is adhered directly to a joint of uninsulated electrical conductors.

* * * * *